Aug. 26, 1930.                C. H. FOSTER                1,773,728
                              SHOCK ABSORBER
                         Filed Aug. 17, 1927        2 Sheets-Sheet 1
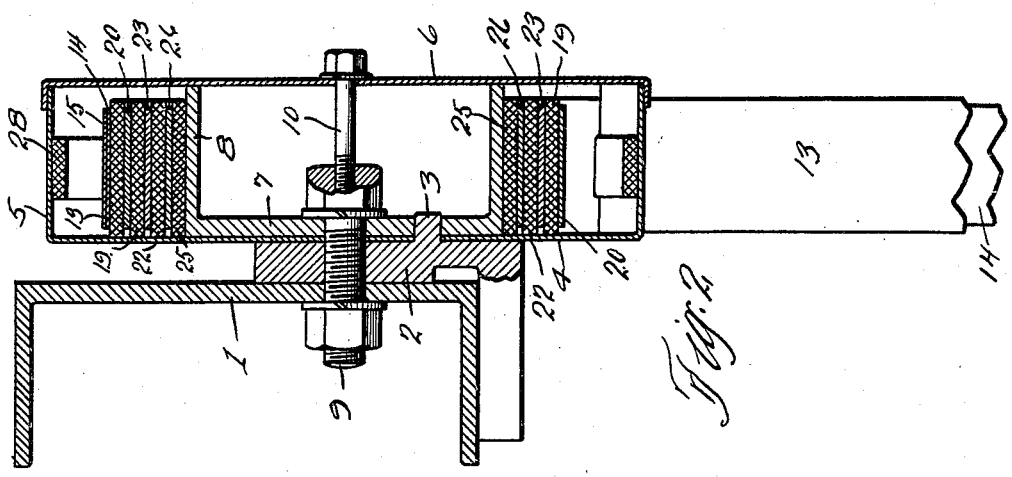
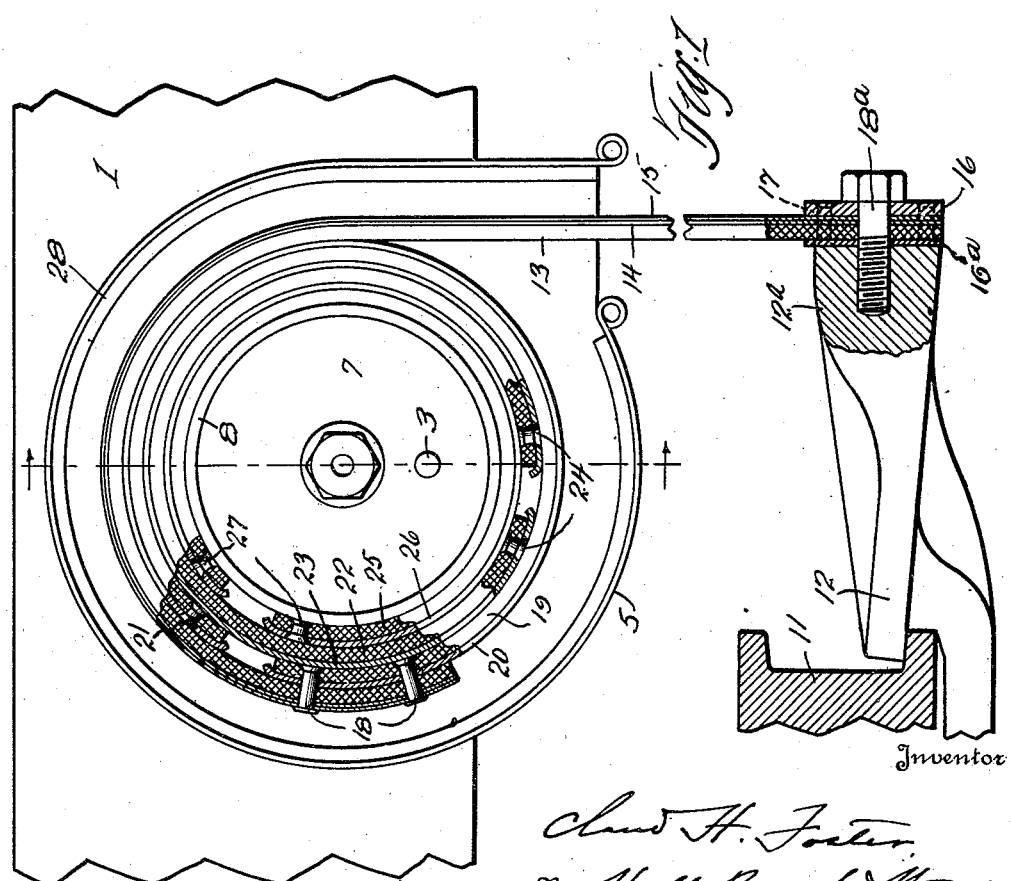

Aug. 26, 1930.  C. H. FOSTER  1,773,728
SHOCK ABSORBER
Filed Aug. 17. 1927   2 Sheets-Sheet 2
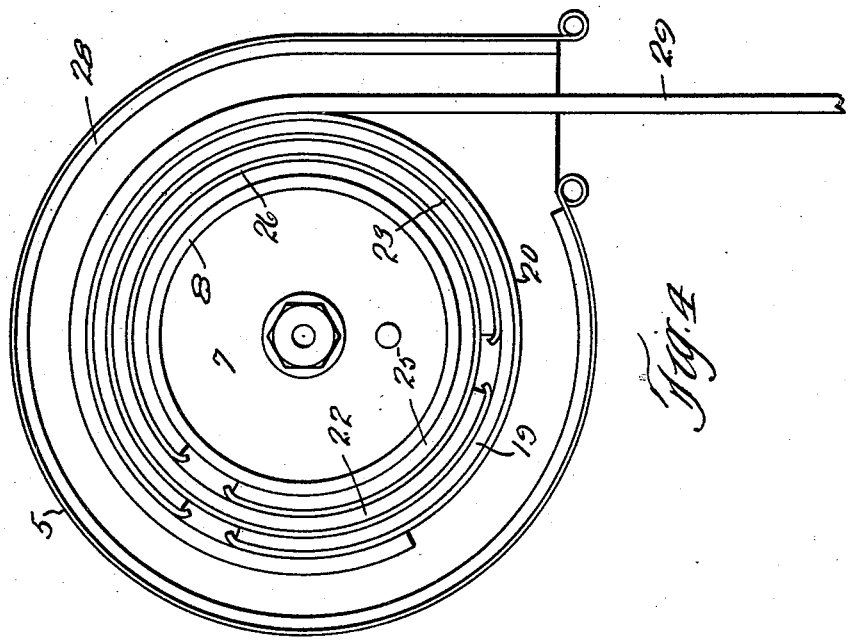
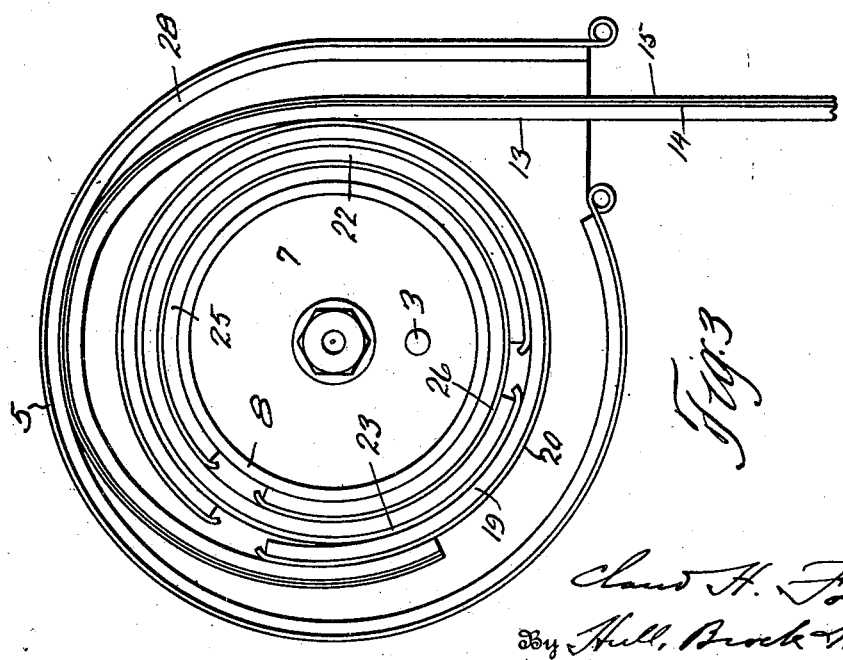
Inventor
Claud H. Foster
By Hull, Brock & West
Attorneys Patented Aug. 26, 1930

1,773,728

UNITED STATES PATENT OFFICE

CLAUD H. FOSTER, OF WICKLIFFE, OHIO

SHOCK ABSORBER

Application filed August 17, 1927. Serial No. 213,469.

This invention relates to shock-absorbing devices such as are interposed between the axles and frames of vehicles for the purpose of reducing the extent of vibration or relative movement of such parts, whereby excessive movement of and injury to the springs of such vehicle is prevented and the comfort of the occupants of the vehicle is enhanced.

Among the general objects of the invention are the following:—to provide a device of this character which can be produced at low cost; which is simple of construction; which is capable of quick and convenient application to and removal from the parts with which it is associated; and which is efficient in operation.

I realize the foregoing advantages in and through a construction of shock absorber in which the braking action of a flexible band upon a drum is secured, but without the necessity for employing a spring for the purpose of resisting or assisting to resist the separation of the axle and frame during the upward or rebound movements of the frame, or of restoring or resetting the band or strap to its initial position upon the drum as the axle and frame approach each other.

The present preferred embodiments of my invention are shown in the drawing, wherein Fig. 1 represents a side elevation of my device as applied to a vehicle frame and axle, certain parts being broken away and parts of the device being shown in the positions which they occupy when the frame and axle are separated to an extent to cause the device to exercise its braking action; Fig. 2 a sectional view corresponding substantially to the vertical sectional line on Fig. 1; Fig. 3 a side elevation of the device, the axle being omitted and showing the positions of the parts when the frame and axle approach each other; and Fig. 4 a view similar to Fig. 3 showing a modification.

Describing the various parts by reference characters, 1 denotes one of the ordinary channel side members of a vehicle frame. Secured to the member 1 is a bracket 2 having a stud projection 3. This stud extends through the back wall 4 of a housing, the said housing having a cylindrical wall 5 and a cover 6; it also extends through the back wall 7 of a brake, the said brake having the cylindrical braking drum 8. The bolt 9 extends through the side member 1, the bracket 2, and the walls 4 and 7. The head of the bolt is tapped to receive the threaded end of a bolt 10 which secures the cover 6 in place.

11 denotes the axle. Secured to the axle in any suitable manner is an arm 12 having at one end a head 12$^a$ by means of which one end of a flexible composite strap is secured to said arm and, through said arm, to the axle 11. This flexible strap in my preferred form comprises a strap member 13 of fibrous material and a pair of spring strips 14 and 15, preferably of thin steel applied to the side thereof which faces the adjacent wall of the housing. The lower ends of the strap and strips are secured to a metal block 16 on one side of such end and a metal strip 16$^a$ on the opposite side of such end by rivets 17, and this reinforced end is secured to the head 12$^a$ by a bolt 18$^a$ extending through such end and threaded into said head.

The strap 13—15 extends upwardly into the housing and has its end fastened, as by rivets 18, to a composite brake band interposed between itself and the brake drum 8. The said brake band comprises an inner strap 19, preferably of compressible fibrous material, having applied to the outside thereof a spring steel strip 20. The strap 19 and the strip 20 are connected by a rivet 21 as well as by the rivets 18, which are extended therethrough.

The brake band 19, 20 is in turn mounted upon another composite brake band which also is composed preferably of an inner strap 22 of fibrous material and an outer spring strip 23, the strap and strip being fastened together by rivets 24. This composite band in turn rides upon another composite band consisting of a strap 25 of fibrous material and an outer spring strip 26, the same being secured together by rivets 27. The innermost band 25, 26 rides upon the outer surface of the drum.

The spring strips 20, 23 and 26 are all given such a curvature that, when assembled in place, they must be opened outwardly so that they tend to close and to grip each the strap within the same against the surface next within and adjacent such strap. The curvature and strength of the spring strips is such that they exercise a progressively increasing braking effect from the outermost to the innermost strip. These strips, as well as the strips 14 and 15, are narrower than the straps to which they are applied, whereby they do not engage the base 4 of the housing and wear the same.

Applied to the interior of the wall 5 of the housing is a piece of strap 28, which may also be of fibrous material and which, under conditions to be described hereinafter, serves to protect the said housing from wear.

With the parts constructed and arranged as described, there is sufficient flexibility in the composite strap 13, 14 and 15 to permit movements of small amplitude of the body and axle toward each other without rotating the band 19, 20 therebeneath. This action is particularly useful in connection with low-pressure, or so-called "balloon", tires, the flexibility of the strap accommodating small irregularities in the roadbed without rotating the brake band. Under slightly greater deflections, which would cause the body and axle to approach each other to a correspondingly greater extent, the back of the strap 13—15 engages the lining member 28, preventing further upward flexing of the strap and causing it to exert a thrust upon the brake band therebeneath, thus rotating said band upon the next band therewithin.

On rebound following the action described, the strap 13—15 will be drawn quickly into tight engagement with the brake band therebeneath, and the pressure exerted upon such band and, through such band and the other bands upon the drum 8, will exercise a braking action in proportion to the severity of the rebound. For comparatively slight rebounds, the strap 13—15 and the brake band therewithin will rotate upon the second brake band without any material movement of the latter band. Upon a severer and correspondingly swifter rebound, the pressure will be sufficient to cause both brake bands 19, 20 and 22, 23, to slide one upon the other and upon the band therewithin. Upon the excessive and correspondingly swiftest rebounds, there will be a sliding movement between all three brake bands as well as a sliding of the innermost band upon the drum 8.

The quickness of application of the braking action and the severity of such action will vary with the distance that the strap 13—15 is projected into the housing, which will, of course, be proportional to the relative movement of the axle and body toward each other. Due to the construction and mode of operation, the braking action will be proportional to the extent to which the axle and frame approach each other, this approach being followed by a proportionally swift rebound movement with a correspondingly quick and strong braking action. For the severest rebounds, all three brake bands will cooperate in quickly checking the rebound, the outer brake bands sliding upon one another and the innermost brank band sliding upon the drum; for less severe rebounds, the braking action will be correspondingly less, as pointed out hereinbefore.

In Fig. 4 there is shown a modification of my invention which differs from the form embodied in the three preceding views only in substituting a single strap 29 for the composite strap 13—15. By using porous or fibrous material for the strap 29 and impregnating it with stiffening material, such as shellac, the strap, while flexible, will possess sufficient rigidity, when brought into contact with the lining strip 28, to rotate the brake band member attached thereto upon the one next therewithin; and the device will operate in the same manner as the one shown in the preceding views.

Having thus described my invention, what I claim is:

1. A shock absorber comprising a brake drum, concentric brake bands mounted upon said drum and each comprising an inner strip of friction material and an outer strip of spring material, and a strap extending in part at least about the outer of said brake bands and connected thereto, the said strap being flexible but possessing sufficient rigidity to rotate the band to which it is connected about the drum through the thrust exerted thereby upon the said band.

2. A shock absorber comprising a brake drum, concentric brake bands mounted upon said drum and each comprising an inner strip of friction material and an outer strip of spring material exercising a compressive action against such inner strip, and a strap extending in part at least about the outer of said brake bands and connected thereto, the said strap being flexible but possessing sufficient rigidity to rotate the band to which it is connected about the drum through the thrust exerted thereby upon the said band.

3. A shock absorber comprising a brake drum, concentric brake bands mounted on said drum and each comprising an inner strip of friction material and an outer strip of spring material exercising a compressive action against such inner strip, and a strap extending in part at least about the said bands and connected to the outer of said bands, the said strap consisting of an inner member of pliable material and one or more strips of spring metal applied to one of the faces of such material.

4. A shock absorber comprising a brake drum, concentric brake bands mounted on said drum, and a strap extending in part at least about the said bands and connected to the outer of said bands, the said strap being flexible but possessing sufficient rigidity to rotate the outermost band through the thrust exerted thereby upon said band.

5. A shock absorber comprising a brake drum, concentric brake bands mounted on said drum, and a strap extending in part at least about the said bands and connected to the outer of said bands, the said strap consisting of an inner member of pliable material and one or more strips of spring metal applied to one of the faces of such material, and a member spaced from the drum and adapted to be engaged by the said strap as the vehicle members to which the shock absorber is attached approach each other, thereby to apply the thrust of the strap to the band to which it is connected.

6. A shock absorber comprising a brake drum, concentric brake bands mounted on said drum and each comprising an inner strip of friction material and an outer strip of spring material exercising a compressive action against such inner strip, and a strap extending in part at least about the said bands and connected to the outer of said bands, the said strap consisting of an inner member of pliable material and one or more strips of spring metal applied to one of the faces of such material, and a member spaced from the drum and adapted to be engaged by the said strap as the vehicle members to which the shock absorber is attached approach each other, thereby to apply the thrust of the strap to the band to which it is connected.

7. A shock absorber comprising a brake drum, concentric brake bands mounted on said drum and each comprising an inner strip of friction material and an outer strip of spring material exercising a compressive action against such inner strip, a strap extending in part at least about the said bands and connected to the outer of said bands the said strap consisting of an inner member of pliable material and one or more strips of spring metal applied to said member, and a housing for and spaced from the said drum, the housing provided with a lining member adapted to be engaged by the said strap as the vehicle members to which the shock absorber is attached approach each other, thereby to apply the thrust of the strap to the band to which it is connected.

8. A shock absorber comprising a brake drum, concentric brake bands mounted on said drum, a strap extending in part at least about the said bands and connected to the outer of said bands, the said strap consisting of an inner member of pliable material and one or more strips of spring metal applied to said member, and a housing for and spaced from the said drum, the housing provided with a lining member adapted to be engaged by the said strap as the vehicle members to which the shock absorber is attached approach each other, thereby to apply the thrust of the strap to the band to which it is connected.

9. A shock absorber comprising a drum, concentric brake bands on said drum comprising each an inner member of compressible frictional material and a strip of spring metal extending about the outer surface of said member, the said strips serving to compress the bands and being given such a curvature and strength that the braking action exerted by each band will increase progressively from the outermost to the innermost band, and a strap connected to the outermost band, the said strap being flexible but possessing sufficient rigidity to rotate the band to which it is connected about the drum through the thrust exerted thereby upon the said band.

10. A shock absorber comprising a drum, a plurality of concentric brake bands on said drum, the innermost band engaging the said drum and the said bands being arranged to exert a frictional braking effect upon one another and upon the said drum, said frictional effect progressively increasing from the outermost band to the innermost band, and a strap connected with the outermost band, the said strap being flexible but possessing sufficient rigidity to rotate the band to which it is connected about the drum through the thrust exerted thereby upon the said band.

11. A shock absorber comprising a brake drum, a brake band mounted upon said drum and comprising an inner strip of friction material and an outer strip of spring metal extending about the outer surface of the inner strip and exercising a compressive action upon the same whereby the outer strip causes the inner stip to grip the said drum, and a strap additional to and secured to the said brake band and extending at least in part around the same and the drum within said band.

12. A shock absorber comprising a brake drum, concentric brake bands mounted upon said drum and each comprising an inner strip of friction material and an outer strip of spring metal exercising a compressive action upon the friction strip therewithin, a strap extending in part at least about the outer of said brake bands and the drum therewithin and connected to such outer brake band.

In testimony whereof, I hereunto affix my signature.

CLAUD H. FOSTER.